United States Patent
Boom et al.

(10) Patent No.: US 9,869,283 B2
(45) Date of Patent: Jan. 16, 2018

(54) ADJUSTMENT DEVICE FOR AIR INLET, METHOD FOR ADJUSTING AN AIR INLET WITH AN ADJUSTMENT DEVICE, MOTOR VEHICLE PROVIDED WITH AN AIR INLET HAVING AN ADJUSTMENT DEVICE

(75) Inventors: Stephen Alexander George Gustavo Boom, The Hague (NL); Erik Alfred Simeon de Vries, Schoonhoven (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 0 days.

(21) Appl. No.: 13/885,424

(22) PCT Filed: Nov. 9, 2011

(86) PCT No.: PCT/NL2011/050766
§ 371 (c)(1),
(2), (4) Date: Jul. 10, 2013

(87) PCT Pub. No.: WO2012/067502
PCT Pub. Date: May 24, 2012

(65) Prior Publication Data
US 2014/0130763 A1    May 15, 2014

(30) Foreign Application Priority Data

Nov. 15, 2010   (NL) ...................................... 2005697

(51) Int. Cl.
*B60K 11/00*    (2006.01)
*F01P 7/02*    (2006.01)
(Continued)

(52) U.S. Cl.
CPC ............ *F02M 35/10* (2013.01); *B60K 11/085* (2013.01); *B60K 11/08* (2013.01); *F24F 13/08* (2013.01)

(58) Field of Classification Search
CPC .......... B60K 11/04; B60K 11/08; F16H 19/08; H02K 7/06; F02M 35/10; B62D 25/081; F24F 13/08
(Continued)

(56) References Cited

U.S. PATENT DOCUMENTS 1,393,161 A * 10/1921 Raleigh .................... F01P 7/10
                                                                        123/41.04
2,752,111 A *  6/1956 Schairer .................. F02C 7/047
                                                                        244/57

(Continued)

FOREIGN PATENT DOCUMENTS

DE        3506156      2/1986
DE        3438709      4/1986
(Continued)

OTHER PUBLICATIONS

International Search Report from PCT/NL2011/050766 (WO 2012/067502), dated Dec. 15, 2011.
(Continued)

*Primary Examiner* — Carlos A Rivera
*Assistant Examiner* — Syed O Hasan
(74) *Attorney, Agent, or Firm* — Swanson & Bratschun, L.L.C.

(57) ABSTRACT

An adjustment device for adjusting an air inlet of a motor compartment of a motor vehicle between at least a first position in which the air inlet is substantially open and a second position in which the air inlet is substantially closed, comprising a drive unit for adjusting the air inlet between at least the first position and the second position, further comprising an auxiliary unit which is arranged for adjusting the air inlet in case of a calamity for bringing the air inlet to a predefined position, comprising at least one energy storage element.

17 Claims, 5 Drawing Sheets

(51) Int. Cl.
*B60K 37/00* (2006.01)
*A62C 2/06* (2006.01)
*F02M 35/10* (2006.01)
*B60K 11/08* (2006.01)
*F24F 13/08* (2006.01)

(58) Field of Classification Search
USPC .......... 123/184.21, 41.04; 180/68.1; 165/98; 296/193.1
See application file for complete search history.

(56) References Cited

U.S. PATENT DOCUMENTS

| | | | |
|---|---|---|---|
| 4,926,921 | A | 5/1990 | Heinemann |
| 5,732,666 | A | 3/1998 | Lee |
| 6,142,108 | A | 11/2000 | Blichmann |
| 6,145,251 | A | 11/2000 | Ricci |
| 6,565,221 | B2 | 5/2003 | Guttenberger |
| 7,866,737 | B2 * | 1/2011 | Browne .............. F24F 13/1426 296/193.1 |
| 8,161,919 | B2 * | 4/2012 | Klotz .................. B60K 11/085 123/41.04 |
| 2002/0056540 | A1 | 5/2002 | Mizorogi |
| 2006/0104074 | A1 | 5/2006 | Boniface |
| 2008/0178526 | A1 | 7/2008 | Browne |
| 2010/0062895 | A1 | 3/2010 | Brouwer |
| 2011/0246023 | A1 | 10/2011 | Lockwood |
| 2012/0012410 | A1 | 1/2012 | Hori |
| 2013/0092462 | A1 | 4/2013 | Chinta |
| 2013/0255599 | A1 | 10/2013 | Jentz |
| 2013/0255604 | A1 | 10/2013 | Rollinger |

FOREIGN PATENT DOCUMENTS

| | | |
|---|---|---|
| DE | 3522592 | 1/1987 |
| DE | 3701584 | 8/1988 |
| DE | 3731980 C1 | 3/1989 |
| DE | 4020953 | 1/1992 |
| DE | 19719991 | 11/1998 |
| DE | 10047952 | 4/2002 |
| DE | 10218700 | 11/2003 |
| DE | 10307632 | 9/2004 |
| DE | 202005 010683 | 10/2005 |
| DE | 60208158 | 8/2006 |
| DE | 102006042627 | 3/2008 |
| DE | 102007030890 | 1/2009 |
| DE | 102009014003 | 9/2010 |
| DE | 102009035362 | 2/2011 |
| EP | 2233343 | 9/2010 |
| EP | 2248693 | 11/2010 |
| EP | 2325035 | 5/2011 |
| EP | 2371602 | 10/2011 |
| EP | 2409872 | 1/2012 |
| FR | 2738779 | 3/1997 |
| JP | 1018744 | 1/1989 |
| JP | 6418744 | 1/1989 |
| JP | 2010/223150 | 7/2010 |
| KR | 10-2004-0097420 | 11/2004 |
| WO | WO 2007/108803 | 9/2007 |
| WO | WO 2007/130847 | 11/2007 |
| WO | WO 2009/091246 A | 7/2009 |

OTHER PUBLICATIONS

International Search Report, from PCT/NL2012/050524 (WO 2013/012337), dated Oct. 5, 2012.
International Search Report from PCT/NL2013/050414 (WO 2013/187760), dated Jul. 17, 2013.
Office Action dated Apr. 24, 2015, from Chinese App No. 2011800558421, with English Translation.
Office Action from U.S. Appl. No. 14/407,139 dated Sep. 28, 2015.
International Search Report from PCT/NL2013/050482 dated Oct. 25, 2013.
Office Action from JP 2013-538679 dated Oct. 26, 2015.
Merkmalsgliederung des Anspruchs 1.
Notice of Allowance from U.S. Appl. No. 14/403,859 dated Jun. 23, 2015.
Notice of Opposition from EP 11782253.6 dated May 7, 2015.
Notice of Opposition from EP 11782253.6 dated Jun. 17, 2015.
Office Action from Korean App No. 10-2013-7013416 dated Aug. 5, 2016 with English translation.

* cited by examiner

ADJUSTMENT DEVICE FOR AIR INLET, METHOD FOR ADJUSTING AN AIR INLET WITH AN ADJUSTMENT DEVICE, MOTOR VEHICLE PROVIDED WITH AN AIR INLET HAVING AN ADJUSTMENT DEVICE

RELATED APPLICATIONS

This application is a 35 U.S.C. §371 national phase application of PCT/NL2011/050766 (WO 2012/067502), filed on Nov. 9, 2011, entitled "Adjustment Device for Air Inlet, Method for Adjusting an Air Inlet with an Adjustment Device, Motor Vehicle Provided with an Air Inlet Having an Adjustment Device", and claims priority to Netherlands Application Serial No. 2005697, filed Nov. 15, 2010, each of which is incorporated herein by reference in its entirety.

TECHNICAL FIELD

The invention relates to an adjustment device for an air inlet of a motor compartment of a motor vehicle.

BACKGROUND

A motor vehicle is typically provided with an air inlet comprising one or more air inlet openings. An air inlet is commonly used to cool the motor of the motor vehicle during operation. Air inlets are usually located at a front of the motor vehicle in front of the motor. Usually a motor can be cooled by means of a coolant, for example, water or oil. This coolant is cooled with air in a heat exchanger, for instance, in a radiator. The air flowing through the air inlet may be guided wholly or partly to the radiator of the motor compartment of the motor of the motor vehicle to cool the motor indirectly via the coolant. It is known to make an air inlet of a motor compartment of adjustable design, allowing the air inlet to be adjusted between an open position and a closed position.

In the closed position of the air inlet the air resistance of the vehicle is lowered, which is beneficial to the fuel consumption of the motor. Moreover, where the efficiency of the motor, fuel consumption and $CO_2$ emission are concerned, a motor of a motor vehicle has an optimum operating temperature, which is typically higher than the ambient temperature. A closed air inlet when the motor is cold is then once again beneficial to fuel consumption. Also, during driving with an open air inlet, the temperature of the motor can fall below the optimum operating temperature, so that fuel consumption may increase. Also at an operating temperature above the optimum operating temperature, fuel consumption of the motor may increase.

It can hence be advantageous to make an air inlet opening of adjustable design. To this end, the air inlet is usually coupled with an adjustment device which comprises a drive unit. With the aid of the drive unit the air inlet can be closed and be opened. When in the case of a closed air inlet the operating temperature of the motor runs up too high, the air inlet can be opened again to provide for sufficient cooling. Solutions are known that seek, in case of a failure in the adjustment device, to allow the air inlet, when closed, still to be opened.

Thus, publication DE 37 01 584 describes an air inlet that can be closed with a blind which is unwindable about an unwinding shaft. The adjustment device comprises a spring which during opening and closing of the blind is relaxed and biased to the opened position, respectively. At an unduly high operating temperature of the coolant and upon failure of the drive unit, the blind is brought to an opened position under the influence of the spring.

A drawback of the above-mentioned adjustment device is that the spring is each time tensioned upon closing of the blind. Consequently, the electric motor is of unduly heavy design. As the electric motor during tensioning of the spring is increasingly heavily loaded, the motor noise changes. This may be experienced as annoying. Also, the mechanism is relatively large, complex and costly.

An object of the invention is to provide an adjustment device of the above-mentioned type which counteracts at least one of the above-mentioned disadvantages.

SUMMARY

To this end, the invention provides an adjustment device for adjusting an air inlet of a motor compartment of a motor vehicle between at least a first position in which the air inlet is substantially open and a second position in which the air inlet is substantially closed, comprising a drive unit for adjusting the air inlet between at least the first position and the second position, furthermore comprising an auxiliary unit which is arranged for adjusting the air inlet in case of a calamity for bringing the air inlet to a predefined position, comprising at least one energy storage element.

Calamity may be understood to mean a failure in the drive unit of the adjustment device and/or a circumstance in the motor vehicle or outside it which may make it desirable to open or close the air inlet quickly. For instance, in case of fire in the motor compartment, or in case of an increased concentration of sand or dust in the ambient air.

By providing an auxiliary unit which comprises an energy storage element, while the auxiliary unit can be coupled with the air inlet when there is a calamity, the air inlet can be reliably brought to a predefined position. The predefined position can be, for example, the first position and/or the second position and/or an intermediate position located between the first and the second position.

By providing an energy storage element the auxiliary unit can be designed as an independent unit with its own energy supply. Thus, in the event of a failure in the drive unit which is related, for instance, to a failure in the energy supply to the drive unit, the air inlet can still be adjusted with the aid of the independent auxiliary unit, since it is separate from the energy supply of the motor vehicle.

It may be advantageous to shut off the air inlet, and hence the oxygen supply to the motor compartment, as much as possible. For instance in case of fire in the motor compartment as a result of overheating of the motor. The energy storage element during normal use of the adjustment device does not exert any force, couple or moment on the air inlet, but exerts a force, couple or moment on the air inlet in case of a calamity only. During normal use the drive unit does not experience any resistance and/or other influence of the energy storage element. Accordingly, the drive unit, in particular the drive, can be dimensioned for merely adjusting the air inlet. As a result, the drive unit can be of relatively inexpensive design. As the energy storage element during normal use does not run along with the drive unit, the energy storage element is insensitive to fatigue and/or wear.

By utilizing an energy storage element, relatively much energy can be released at once, so that the air inlet can be adjusted relatively quickly to the first position or the second position or a predefined intermediate position. A relatively quick adjustment of the air inlet may be favorable, for instance in case of overheating of the motor, so that air can be supplied relatively quickly to the motor to cool it. Also, in the event of an air inlet being stuck due to, for example, freezing or dirt, the energy that can be released from the energy storage element at once can open or close the air inlet again. Or, for instance, in case of fire in the motor compartment, by utilizing an energy storage element, the air inlet can be closed relatively quickly if it was wholly or partly open.

The auxiliary unit may comprise only the energy storage element, wherein during normal use the energy storage element is free of the air inlet and in the event of a failure the energy storage element is coupled with the air inlet.

The auxiliary unit may furthermore comprise an operating element for adjusting the air inlet in case of a calamity under the influence of the energy storage element. The energy storage element may, for instance, be coupled directly with the air inlet or may be coupled with the air inlet via the operating element. During normal use the energy storage element is free of the air inlet and/or the drive unit so that the drive unit does not experience any influence of the energy storage element. In the event of a calamity, the energy storage element couples in one way or the other, for instance, via an operating element, or via a part of the drive train of the drive unit, with the air inlet for adjusting the air inlet.

The operating element can comprise, for example, a spring, a lever, a memory metal, a rack, a pyrotechnic element, a motor, a bimetal, a compressed air operation, a vacuum operation, a hydraulic operation. Many embodiments of an operating element are possible.

Advantageously, the energy storage element is arranged for releasing energy to the operating element, so that the operating element can couple with the air inlet for adjusting the air inlet.

The auxiliary unit may furthermore comprise an activation element for activating the energy storage element. The activation element receives and/or registers and/or establishes a failure or failure report. In the event of a failure in the drive unit, the activation unit is activated. The activation unit can register the failure itself, for example, with a temperature sensor, or the activation unit can receive a failure report, for example, from the motor management system or from the drive unit itself. The activation element will then activate the energy storage element, which in turn provides the operating element, if present, with energy for coupling with the air inlet and adjusting the air inlet. The activation element can comprise, for example, a thermocouple, a temperature sensor, a signal from the motor management system, a spring, a bimetal element, a nitinol element, a $CO_2$ alarm, etc.

By biasing the energy storage element, the air inlet, through the activation of the energy storage element, can be simply and reliably opened or closed. Optionally, two energy storage elements may be provided, one of which is biased for an adjustment to the first position or a predefined intermediate position and one is biased for adjustment to the second position or a predefined intermediate position. Depending on the situation and/or the failure, the air inlet can be adjusted relatively quickly and reliably to the first position or to the second position.

Advantageously, the energy storage element comprises an elastic element, such as, for example, a spring, a rubber element or an element with fluid under pressure. The spring may be configured, for example, as a torsion spring, a spiral spring, a draw spring, a compression spring, or a leaf spring. Different embodiments of a spring and combinations thereof can be possible.

The energy storage element may also comprise a capacitor element, or a battery or a coil element in which electric and/or electromagnetic energy can be stored. Also, the energy storage element may comprise, for example, a memory metal and/or a bimetal element and/or a pyrotechnic element. Various energy storage elements can be possible. An energy storage element may be arranged for storing, for example, kinetic energy, electrical energy, electromagnetic energy, potential energy, thermal energy, chemical energy, etc.

Advantageously, the drive unit comprises an electrical drive, for example, an electrical actuator. However, the adjustment device may also be driven with the aid of a compressed air drive, a vacuum drive and/or a hydraulic drive. Optionally, use can be made of the compressed air facility and/or the vacuum facility and/or the hydraulic facilities that are present in the vehicle. An electrical drive can be a stand-alone drive and/or can utilize the electrical system that is present in the motor vehicle.

Preferably, the drive is connected with the air inlet via a drive train. Advantageously, the drive train comprises an evoloid toothing. By providing an evoloid toothing, a relatively high transmission ratio can be obtained in a relatively compact manner. An evoloid toothing is a modified evolute toothing with a limited number of teeth on the pinion, preferably fewer than four. An evoloid toothing is known to the skilled person and is not further elucidated here. The drive train can thus be of relatively compact design. In an advantageous embodiment the drive unit may be included in a housing. The housing may to some extent be dustproof and splashproof, so that the drive unit to some extent is protected from, for example, dirt. By including the drive unit in a housing, the drive unit can be built into the motor vehicle relatively simply.

Optionally, the energy storage element may also be included in the housing of the drive unit, however, the energy storage element may also be included in a separate housing. By including the energy storage element in a separate housing, the energy storage element may for instance be built into the motor vehicle at another location.

An air inlet can comprise, for example, two air inlet openings located next to each other. Each air inlet opening may be provided with an own drive unit which is included in a separate housing which is built in next to the respective air inlet opening. According to the invention, the air inlet is provided with an energy storage element for adjusting the air inlet in case of failure of one or both drive units. The energy storage element may be included in a separate housing and may be built in between the two air inlet openings to adjust both air inlet openings simultaneously, in case of failure.

Further advantageous embodiments are represented in the dependent claims.

The invention furthermore relates to a method for adjusting an air inlet of a motor vehicle.

The invention furthermore relates to an air inlet provided with such an adjustment instrument and to a motor vehicle provided with such an air inlet.

BRIEF DESCRIPTION OF THE DRAWINGS

The invention will be elucidated in more detail on the basis of an exemplary embodiment of an adjustment device which is shown in a drawing. In the drawing.

DETAILED DESCRIPTION

Figure 1:
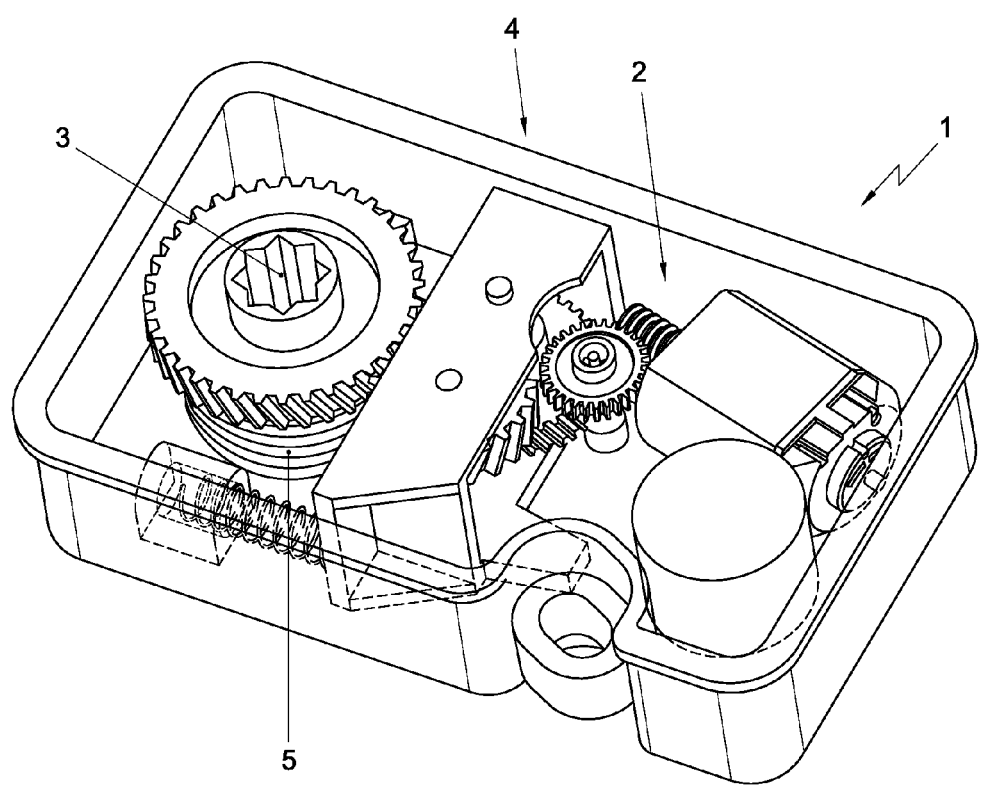
FIG. 1 shows a schematic perspective view of a first exemplary embodiment of an adjustment device according to the invention.

In the figures, the same or corresponding parts are designated with the same reference numerals. It is noted that the figures are merely shown by way of exemplary embodiment and should not in any way be construed as limiting.

FIG. 1 shows an adjustment instrument 1 for adjusting an air inlet of a motor compartment of a motor vehicle. With the aid of the adjustment instrument 1 the air inlet can be adjusted between at least a first position in which the air inlet is substantially open, the so-called open position, and a second position in which the air inlet is substantially closed, the so-called closed position. Depending on its configuration, the air inlet may also be adjusted to one or more intermediate positions situated between the open position and the closed position. The intermediate positions may be defined as discrete positions, or the adjustment instrument may be adjustable between the first and the second position in a continuous manner.

Many embodiments of an air inlet may be possible. An air inlet comprises one or more air inlet openings along which ambient air can be guided wholly or partly to a heat exchanger provided with a coolant, for example, a radiator element, in front of the motor compartment of the motor vehicle. The motor in the motor compartment is then cooled with the coolant of the radiator element. For instance, a single air inlet opening may be provided at the front of the motor vehicle, or two air inlet openings located next to each other may be provided at the front of the motor vehicle. Also, one or more air inlets may be situated on a side of the motor vehicle.

The air inlet according to the invention is of adjustable design. To that end, the air inlet may be provided with a shutoff device with shutoff elements, not shown, such as, for example, vertical and horizontal strips, a blind, a curtain, a folding curtain, a roller blind, inflatable elements, etc. With the aid of the shutoff elements the air inlet opening may be wholly or partly closed or opened.

The adjustment instrument 1 comprises a drive unit 2 for adjusting the air inlet. The drive unit 2 is coupled with an output shaft 3. The output shaft 3 is coupled with the air inlet for adjusting the air inlet. During normal operation the drive unit 2 will operate the shutoff elements of the air inlet for adjusting the shutoff elements, depending on the desired cooling of the motor.

In normal operation, the drive unit 2 will adjust the air inlet to the predefined position. In case of a calamity, for example, a failure of the drive unit, an overheating of the motor or fire in the motor compartment, it may still be desirable to adjust the air inlet. To this end, the adjustment device 1 is provided with an auxiliary unit 4 which is arranged to couple with the air inlet in case of a failure of the drive unit 2. The auxiliary unit 4 comprises an energy storage element 5. The auxiliary unit 4 in this exemplary embodiment is furthermore provided with an activation element, not shown.

In FIG. 2 adjustment of the air inlet with the aid of the auxiliary unit 4 is shown.

Figure 2A:
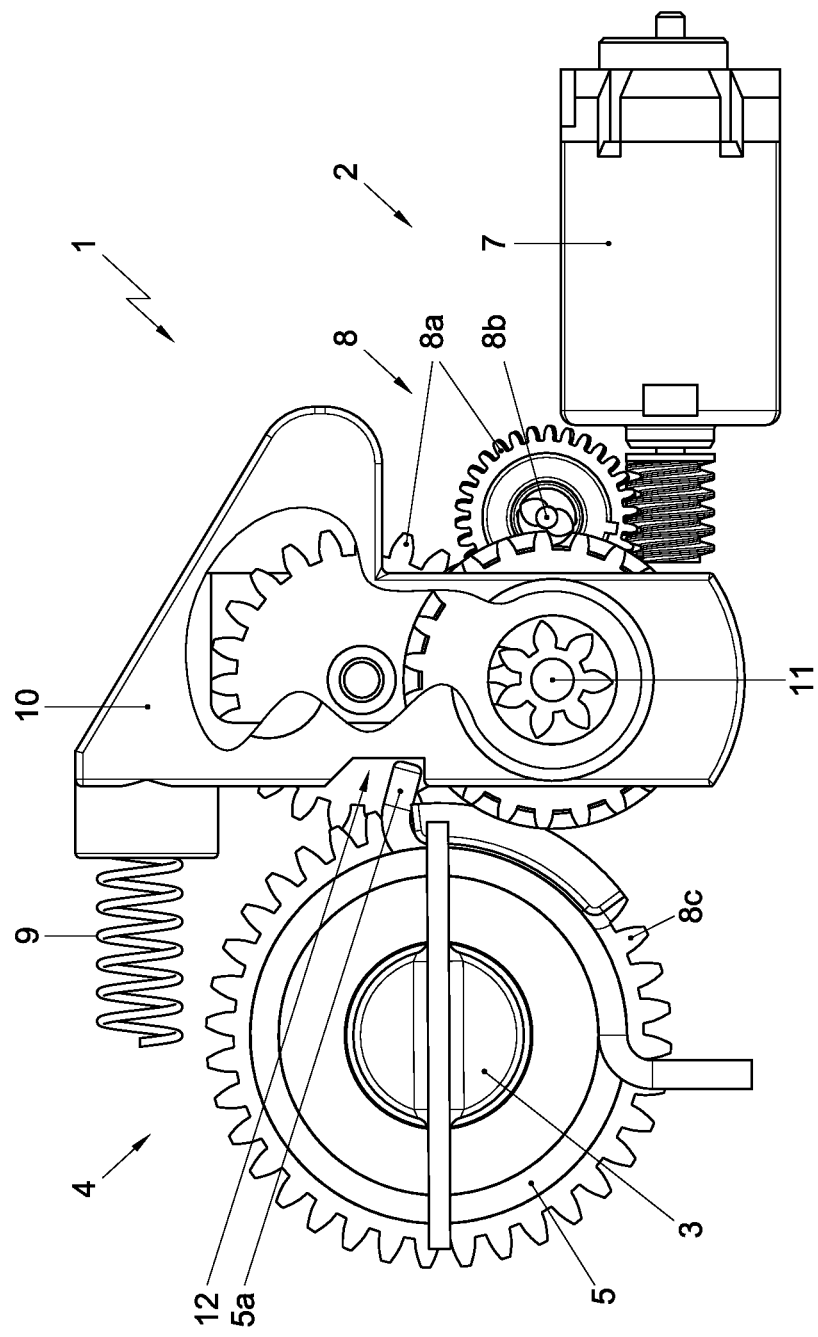
FIG. 2a shows a schematic top plan view of the embodiment of FIG. 1 during normal use of the adjustment device.

FIG. 2a shows the adjustment device 1 during normal use. The drive unit 2 is coupled with the output shaft 3, which is in a predefined position with the air inlet in a corresponding predefined position, for example, an open position in which the air inlet is substantially open. The drive unit 2 comprises a motor 7 which is coupled with the output shaft 3 via a drive train 8. The drive train 8 here comprises a number of mutually coupled gearwheels 8a, among which a pinion 8b provided with an evoloid toothing for a high transmission ratio in a compact manner.

The adjustment device 1 comprises furthermore the auxiliary unit 4 with the energy storage element 5, here a torsion spring. In this exemplary embodiment, the auxiliary unit 4 also comprises an activation element 9, here a biased compression spring. In this exemplary embodiment, there is no separate operating element provided.

One end 5a of the torsion spring 5 is confined in a recess 12 of a bridge 10, so that the torsion spring 5 is biased. During normal use the torsion spring 5 sits freely around the output shaft 3, and the output shaft 3, or the gearwheel 8c coupled with the output shaft 3, does not experience any hindrance from it.

Figure 2B:
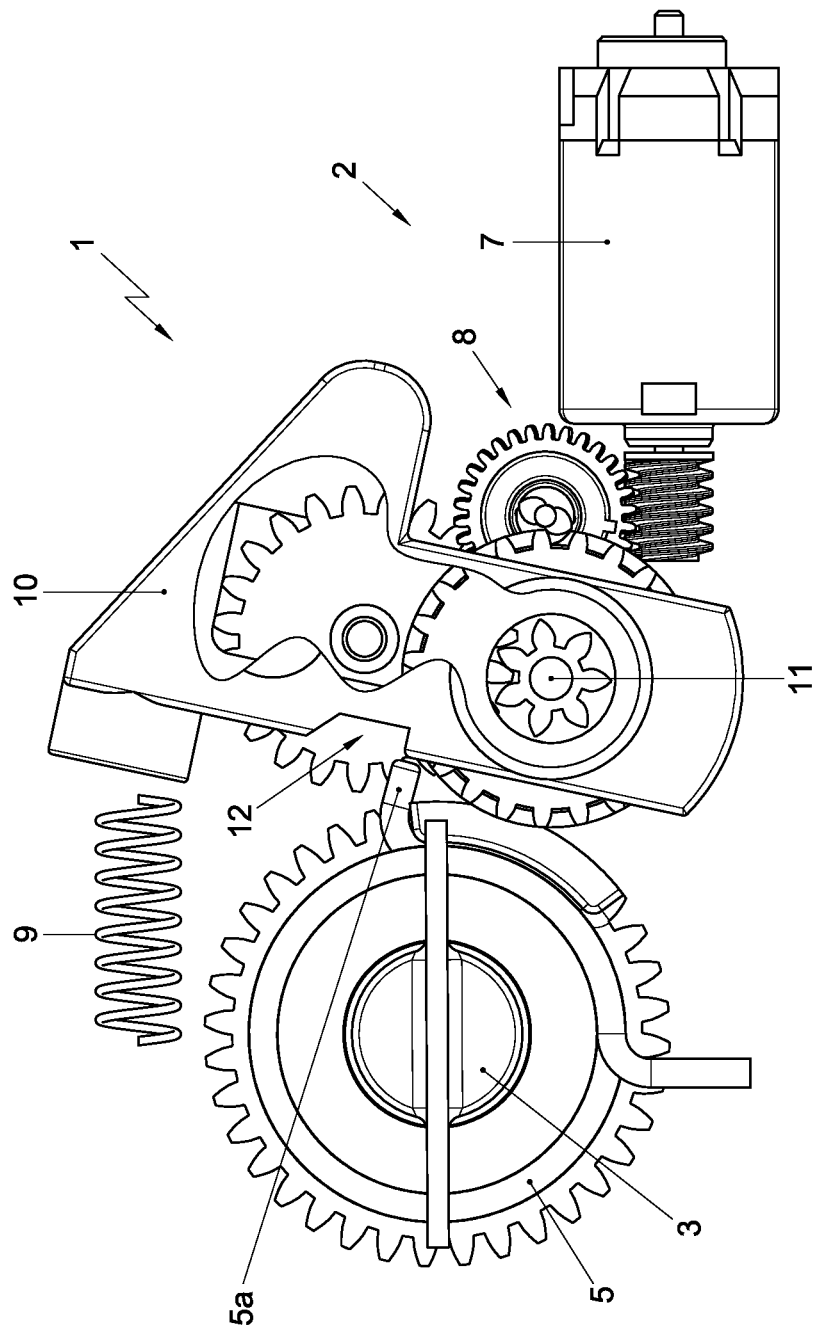
FIG. 2b shows a schematic top plan view of the embodiment of FIG. 1 during coupling of the energy storage element with the air inlet.
Figure 2C:
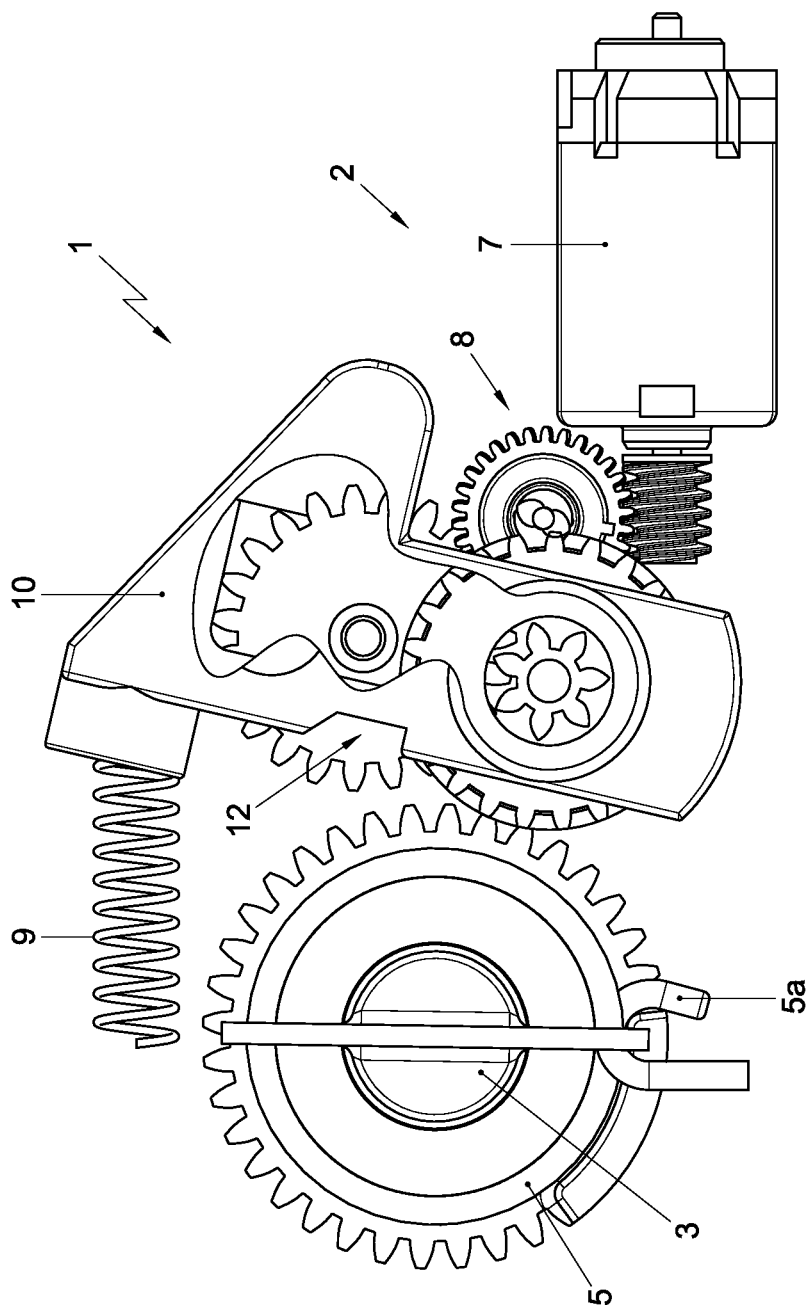
FIG. 2c shows a schematic top plan view of the embodiment of FIG. 1, with the energy storage element coupled with the air inlet for adjusting the air inlet.

In FIG. 2b it is shown what happens when the activation element 9 receives a calamity report and/or senses a calamity. The biased compression spring 9 relaxes, as a result of which the bridge 10 is pivoted about a shaft 11. As a result, the end 5a of the spring 5 comes clear of the recess 12, and the spring 5 can couple with the output shaft 3. Due to the bias of the spring 5, the output shaft 3 is pivoted and the air inlet is adjusted to another predefined position, as shown in FIG. 2c. In FIG. 2c it is shown that the output shaft 3 has pivoted, as a result of which the air inlet has been adjusted relative to the position shown in FIG. 2a.

Figure 3:
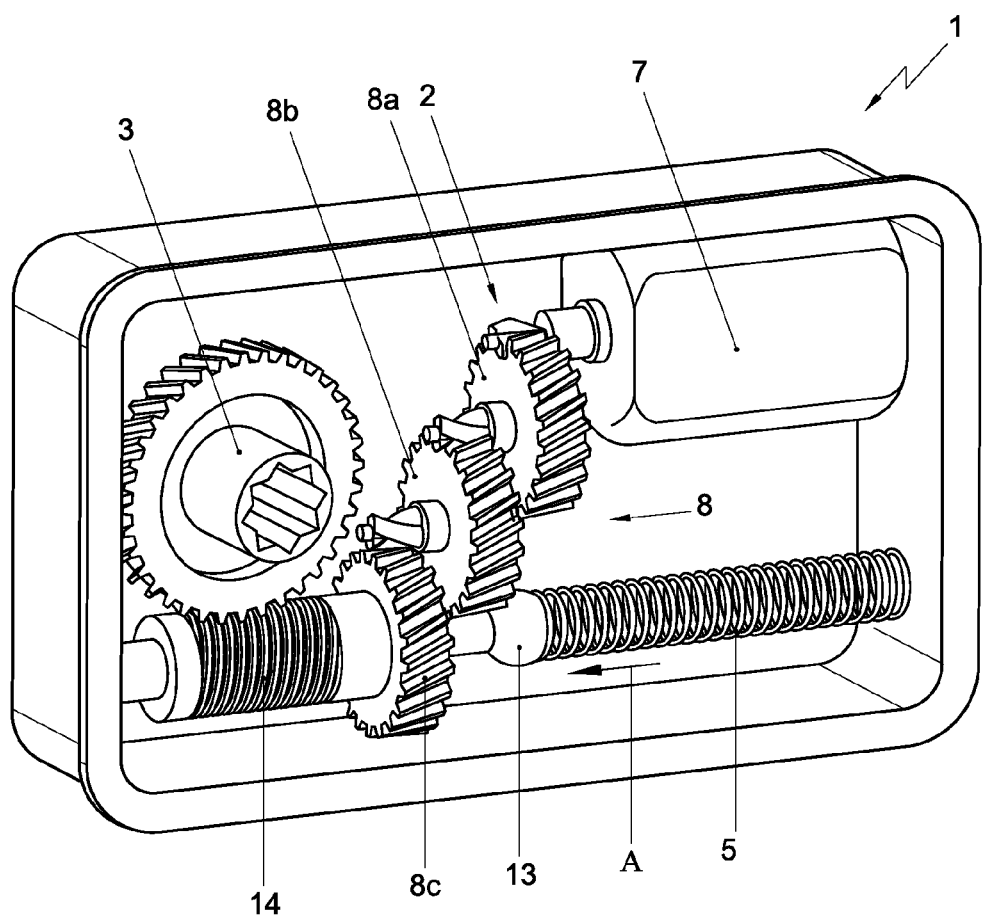
FIG. 3 shows a schematic perspective view of a second exemplary embodiment of an adjustment device according to the invention.

FIG. 3 shows an alternative embodiment of an adjustment instrument 1 according to the invention. The drive unit 2 comprises an actuator 7 and a drive train 8 which comprises a number of gearwheels and pinions with an evoloid toothing. Drive train 8, finally, also comprises the output worm 14, here in a simplified representation. The drive unit 2 is coupled with the output shaft 3 by means of the worm 14, the worm 14 being received in a rotation-locked manner in gearwheel 8c, which is part of the drive train 8. During normal use the actuator 7 drives the drive train 8. Via the rotation lock of the worm 14 with gearwheel 8c, worm 14 starts to rotate. A toothing of the output shaft 3 (not shown) engages in the worm 14, as a result of which the output shaft 3 is adjusted.

The auxiliary unit 4 comprises the energy storage element 5, here a biased compression spring 5. In case of a calamity, the spring 5 is relaxed, for example by an activation element, not shown here. The relaxed spring 5 couples with an operating element 13 which is here part of the worm 14. During normal use the spring 5 is clear of the drive unit 2 and of the output shaft 3. The drive unit 2 during normal use does not experience any hindrance, resistance or force from the spring 5. As a result of the relaxation of the spring 5, the worm 14 translates in axial direction in the direction of arrow A, and like a rack drives the output shaft 3, whereby the air inlet is adjusted. In a preferred embodiment, spring 5 is configured as a spring of nitinol (memory metal). A rise of the ambient temperature then suffices to cause the spring 5 to relax.

Many variants are possible and will be clear to the skilled person. For example, the auxiliary unit may comprise only a memory metal element which, for example, is capable of detecting an unduly high temperature, as a result of which it turns over and energy is released and the output shaft can be adjusted. Such a memory metal element designed, for example, as a lever, then comprises the functions of an activation element, an energy storage element and an operating element. Thus the auxiliary unit can be designed in a compact and efficient manner. Also, such a memory metal element may be coupled, for example via a gearwheel or otherwise, with the output shaft in case of activation. These and other variants are understood to fall within the scope of the following claims.

The invention claimed is:

1. An adjustment device for adjusting an air inlet of a motor compartment of a motor vehicle between at least a first position in which the air inlet is substantially open and a second position in which the air inlet is substantially closed, comprising a drive unit for adjusting the air inlet between at least the first position and the second position, wherein the drive unit comprises an electric motor for enabling the drive to adjust the air inlet between at least the first position and the second position and at least the second position and the first position, the adjustment device furthermore comprising an auxiliary unit which is arranged for adjusting the air inlet in case of a calamity for bringing the air inlet to a predefined position, comprising at least one energy storage element, wherein the energy storage element supplies the auxiliary unit with its own independent energy supply separate from an energy supply of the electric motor of the drive unit, and wherein the auxiliary unit is independent of the drive unit such that during normal use the energy storage element is not acted on by operation of the drive unit and in the case of a calamity the energy storage element is coupled with the air inlet to bring the air inlet to the predefined position.

2. The adjustment device according to claim 1, wherein the auxiliary unit comprises an operating element for adjusting the air inlet under the influence of the energy storage element.

3. The adjustment device according to claim 2, wherein the energy storage element is arranged for releasing energy to the operating element.

4. The adjustment device according to claim 1, wherein the auxiliary unit furthermore comprises an activation element for activating the energy storage element.

5. The adjustment device according to claim 1, wherein the energy storage element is biased for an adjustment to at least one of the first position or the second position.

6. The adjustment device according to claim 1, wherein the energy storage element comprises at least one elastic element.

7. The adjustment device according to claim 6, wherein the elastic element comprises a spring element.

8. The adjustment device according to claim 1, wherein the energy storage element comprises at least one of the following elements: a capacitor element, a coil element, a memory metal element, a bimetal element, a pyrotechnic element.

9. The adjustment device according to claim 1, wherein the drive unit comprises at least one of an electrical drive, a compressed air drive, a vacuum drive or a hydraulic drive.

10. The adjustment device according to claim 9, wherein the drive is connected with the air inlet via a drive train.

11. The adjustment device according to claim 10, wherein the drive train comprises an evoloid toothing.

12. The adjustment device according to claim 1, wherein the drive unit is included in a housing.

13. The adjustment device according to claim 12, wherein the energy storage element is included in the housing.

14. An air inlet provided with an adjustment device according to claim 1.

15. A motor vehicle provided with an air inlet having an adjustment device according to claim 1.

16. A method for adjusting an air inlet of a motor vehicle between at least a first position in which the air inlet is substantially open and a second position in which the air inlet is substantially closed, the method comprising:
   providing an adjustment device having a drive unit comprising an electric motor and having an auxiliary unit comprising an energy storage element, wherein the energy storage element supplies the auxiliary unit with its own independent energy supply separate from an energy supply of the electric motor of the drive unit, wherein the auxiliary unit is independent of the drive unit, such that during normal use the energy storage element is not acted on by operation of the drive unit and in the case of a calamity the energy storage element is coupled with the air inlet to bring the air inlet to the predefined position;
   enabling, with the electric motor, the drive unit to adjust the air inlet between at least the first position and the second position and at least the second position and the first position;
   determining whether the drive unit has failed;
   in response to a determination that the drive unit has failed, coupling the auxiliary unit with the air inlet for moving the air inlet to a predefined position.

17. An adjustment device for adjusting an air inlet of a motor compartment of a motor vehicle between at least a first position in which the air inlet is substantially open and a second position in which the air inlet is substantially closed, comprising a drive unit for adjusting the air inlet between at least the first position and the second position, wherein the drive unit comprises an electric motor for enabling the drive to adjust the air inlet between at least the first position and the second position and at least the second position and the first position, the adjustment device furthermore comprising an auxiliary unit which is arranged for adjusting the air inlet in case of a calamity for bringing the air inlet to a predefined position, wherein the auxiliary unit has components independent of and separate from the drive unit, such that during normal use the energy storage element is not acted on by operation of the drive unit and in the case of a calamity the energy storage element is coupled with the air inlet to adjust the air inlet to the predefined position.

* * * * *